Patented Jan. 22, 1952

2,583,520

UNITED STATES PATENT OFFICE 2,583,520

QUINAZOLINE DERIVATIVE VAT DYESTUFFS

Paul Sutter, Binningen, and Walter Kern, Sissach, Switzerland, assignors to Ciba Limited, Basel, Switzerland, a Swiss firm No Drawing. Application September 11, 1950, Serial No. 184,343. In Switzerland September 16, 1949

5 Claims. (Cl. 260—261)

This invention relates to the manufacture of new vat dyestuffs.

It is known that among the quinazoline derivatives there are some which are valuable intermediate products for the manufacture of vat dyestuffs (see French Patents Nos. 822,194 and 822,428). These quinazolines have however hitherto mostly been produced by alkaline ring closure of 2-aroylamino-anthraquinone-3-carboxylic acid amides, according to the scheme

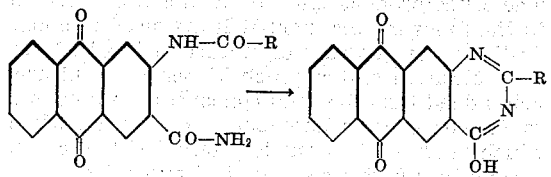

in which R indicates an aromatic radical, especially a benzene radical. Thereupon the OH—group in the quinazoline radical was replaced by chlorine. A further examination of this process has shown that ring closure only takes place when the radical R is aromatic.

The subject of U. S. patent application Serial No. 756,808, filed June 24, 1947 (now Patent No. 2,530,025) is a simplified process for the manufacture of quinazoline derivatives, as therein defined, which process consists in that acylamino-anthraquinone-ortho-nitriles are heated with phosphorous pentachloride.

The present invention is in part based upon the observation that a valuable quinazoline derivative can be produced when 3-cyano-2-cinnamoylamino-anthraquinone is subjected to the quinazoline ring closure with phosphorus pentachloride.

The compound serving as starting material in this feature of the present invention can be obtained in a simple manner by acylation of 3-cyano-2-aminoanthraquinone by means of cinnamic acid chloride. The ring closure to the corresponding quinazoline derivatives, as above stated, takes place with the aid of phosphorous pentachloride and it can be carried out, advantageously in an indifferent agent such as nitrobenzene, at elevated temperature, for example between 150° C. and the boiling point of the nitro-benzene. In this manner the quinazoline derivative is obtained of the formula

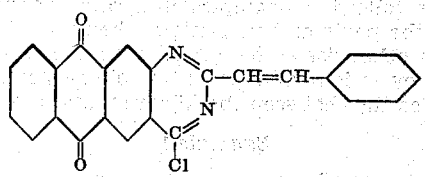

The success of this process is surprising since, according to the process initially mentioned herein, by means of alkaline ring closure from 2-cinnamoylamino - anthraquinone - 3 - carboxylic acid amide the corresponding 4-hydroxy-quinazoline derivative cannot be obtained.

According to a further feature of the present invention valuable new vat dyestuffs are obtained by reacting the quinazoline obtained according to the above directions, which is substituted in 4-position of the quinazoline radical by chlorine and in 2-position by the grouping —CH=CH—phenyl, with 4-aminoanthraquinone-2:1-(N)-benzene acridones. In this manner dyestuffs are obtained of valuable green color shades and good fastness properties, such as are not easily obtainable with other components in the same color shades with similar fastness properties. The 4-aminoanthraquinone-2:1(N)-benzene acridones to be employed can, if desired, also contain further substituents, for example halogen atoms, such as chlorine, bromine, or fluorine, for example in one or both of the positions 6 and 7 of the anthraquinone radical, or especially in the Bz-nucleus, for example a chlorine atom in para- or meta-position to the nitrogen atom of the acridone ring. As examples may be mentioned 5'-chloro and 6'-chloro-4-amino-anthraquinone-2:1(N)-1':2'-(N)-benzene acridone and also 4-amino - 6:7 - dichloranthraquinone - 2:1(N) - 1':2'(N)-benzene acridone. The last mentioned amine component is new and can be produced from 1 - amino - 4 - bromo - 6:7 - dichloranthraquinone-2-sulfonic acid by methods known per se.

The reaction of the quinazoline with the aminoanthraquinone benzacridone is advantageously carried out in such a manner that per mol of the quinazoline one mol of the amine is employed. The reaction can be carried out for example in high boiling solvents such as nitrobenzene, dichlorobenzene or phenol at elevated temperature, for example at the boiling temperature of the solvent concerned. It may also be possible to work using an excess of the particular amine as solvent.

The intermediate product and also the vat dyestuffs obtained according to the present invention are new. The vat dyestuffs can be employed in known manner for the dyeing and printing of a wide variety of materials such as wool and silk and especially for the dyeing and printing of cellulosic fibers such as cotton and artificial silk and also staple fiber from regenerated cellulose. They can also be converted according to known processes into salts of the leuco-sulfuric acid esters and similar compounds and can be employed according to the methods customary for this class of dyestuffs. The good fastness properties of the dyestuffs obtained, especially their good resistance to the combined chlorine bucking, are surprising in consideration of the presence of the unsaturated araliphatic radical

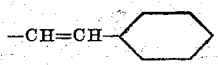

The following examples illustrate the invention, the parts and percentages being by weight unless otherwise stated and the relation between parts by weight and parts by volume being the same as that between the kilogram and the liter:

*Example 1*

3.8 parts of 2-cinnamoylamino-3-cyananthraquinone of the formula

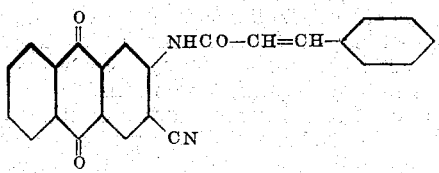

(obtainable by heating for one hour to 185° C., 21.5 parts of 2-cinnamoylamino-3-bromanthraquinone together with 5 parts of cuprous cyanide and 45 parts of pyridine in 420 parts of nitrobenzene) are heated for ½ hour to 180–185° C. with 2.5 parts of phosphorus pentachloride in 72 parts of nitrobenzene. After cooling the whole is filtered, washed with benzene and dried. A brownish crystal powder is obtained which dissolves in concentrated sulfuric acid with a brown color.

*Example 2*

4.2 parts of the product obtained according to Example 1 of the formula

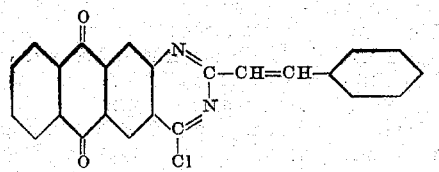

are heated to boiling for ¼ hour together with 3.2 parts of 4-aminoanthraquinone-2:1(N)-benzene acridone in 105 parts of phenol. After the addition of 105 parts of pyridine the whole is cooled to about 60° C., filtered and the residue washed with benzene and dried. The condensation product can be purified by fractional crystallization from sulfuric acid. It corresponds to the formula

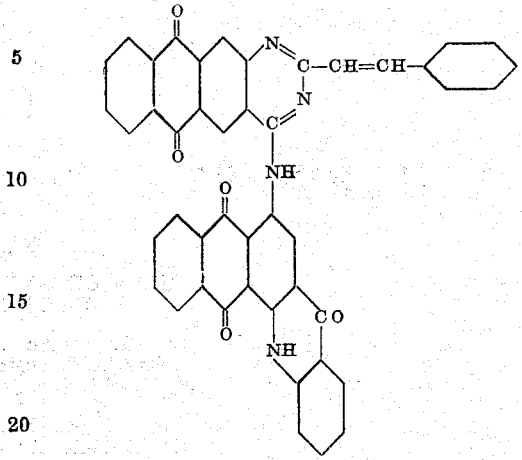

and dissolves in concentrated sulfuric acid with a brown color and dyes cotton from a violet-brown vat, in fast bottle green shades.

*Example 3*

1.5 parts of the chloroquinazoline obtained according to Example 1 are heated for 10 minutes to boiling together with 1.4 parts of 5'-chloro-4-aminoanthraquinone - 2:1(N) - 1':2'(N) - benzene acridone in 20 parts of phenol. Thereupon 20 parts of pyridine are added, the whole allowed to cool to about 50° C. and filtered with suction and the residue washed with alcohol and dried. The crude product thus obtained can be purified in the following manner: It is dissolved in about 50 times the quantity of sulfuric acid of 98 per cent. strength and so much 50 per cent. sulfuric acid added that the final concentration amounts to 76 per cent., whereupon the brown sulfate which recrystallizes out is filtered with suction, decomposed with water, washed and dried.

The dyestuff thus produced corresponds to the formula

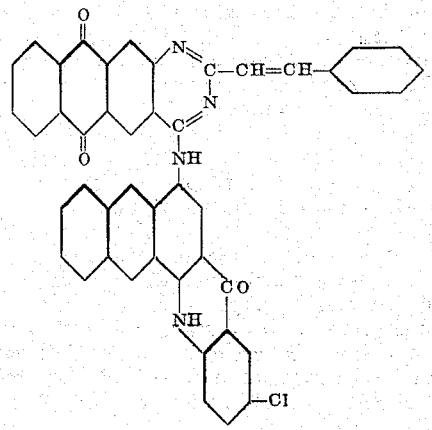

and dyes cotton from a violet-brown vat in yellow-green shades.

By taking in this example instead of 5'-chloro-4-aminoanthraquinone-2:1(N)-1':2'(N)-benzene acridone the 6' - chloro-4-aminoanthraquinone-2:1(N)-1':2' - (N) - benzene acridone a similar dyestuff is obtained.

*Example 4*

1.5 parts of the chloroquinazoline obtained according to Example 1 are heated to boiling for ¼ hour with 1.4 parts of 4-amino-6:7-dichloroanthraquinone - 2:1(N)-1':2'(N)-benzene acridone in 20 parts of phenol. 20 parts of pyridine are added and the whole cooled to about 50° C. and filtered with suction and the residue washed with alcohol. The crude product can be purified in a similar manner to that described in Example 3. A product is thus obtained which corresponds to the formula

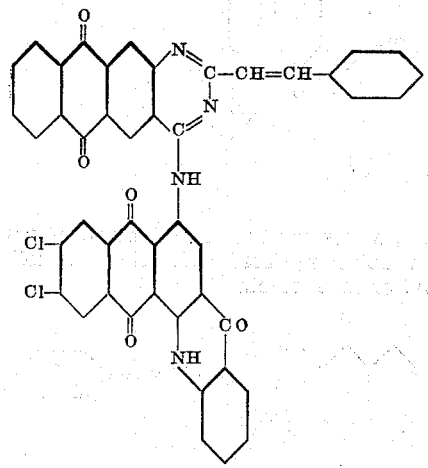

and dyes cotton from a brown vat in yellow-green shades.

The 6:7-dichloro-4-aminoanthraquinone- 2:1(N)-1':2'(N)-benzene acridone employed in this example is new and can be produced for example as follows:

29.2 parts of powdered 1-amino-6:7-dichloranthraquinone in 300 parts of trichlorobenzene, after addition of 15 parts of chlorsulfonic acid, are gradually heated to 200° C. and maintained for two hours at this temperature. After cooling 500 parts of water are added and then ammonia to the production of an alkaline reaction, whereupon the trichlorobenzene is distilled off with steam. The solution is filtered hot and the ammonium salt of the 1-amino-6:7-dichloranthraquinone-2-sulfonic acid salted out by addition of ammonium sulfate. After filtration with suction, washing and drying, it is obtained in small red needles.

33 parts of finely powdered ammonium salt are suspended in 900 parts of water and 5 parts of concentrated sulfuric acid. Thereupon 15.5 parts of bromine are added gradually at 0 to 5° C. and the whole is stirred for a prolonged period at this temperature and then diluted with 4000 parts of water, ammonia added to the production of an alkaline reaction and then the whole heated to boiling and filtered hot with suction. From the filtrate, by addition of ammonium sulfate, the ammonium salt of the 1-amino-4-bromo-6:7-dichloranthraquinone - 2 - sulfonic acid is precipitated in the form of red needles.

47 parts of the ammonium salt thus produced are mixed with 5 parts of cuprous chloride and 2 parts of copper powder and this mixture gradually introduced into a solution of 100 parts of sodium acetate, 8 parts of sodium carbonate and 20 parts of anthranilic acid in 2000 parts of water. After heating for 2 hours to 80° C., the blue solution is filtered with suction and the residue washed with hot water and the filtrate acidified and the precipitated blue product filtered with suction, washed and dried.

39 parts of the compound produced as above of the formula

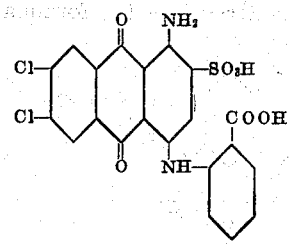

are dissolved in 1500 parts of water and 9 parts of sodium carbonate. A mixture of 16.2 parts of sodium hydrosulfite with 13.5 parts of sodium carbonate is gradually added. The desulfonated product precipitates gradually. After some time it is filtered with suction, thoroughly washed and dried.

33 parts of the blue powder produced as above are introduced into 230 parts of chlorsulfonic acid and stirred for 4 hours at 20–25° C. The whole is diluted first with sulfuric acid and then with water with the production of a sulfuric acid of 65 per cent. strength, the temperature being allowed to rise to 100° C. After cooling and filtering with suction the product is washed with water and dried. The 4-amino-6:7-dichloranthraquinone-2:1(N)-1':2'(N)-benzene acridone thus produced of the formula

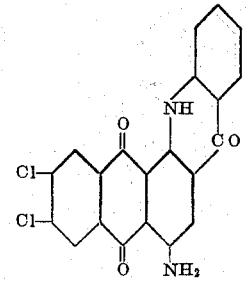

is a deep blue powder.

Example 5

1 part of the dyestuff obtained according to Example 2 is vatted at 50–60° C. in 100 parts of water by addition of 2 parts of sodium hydrosulfite and 4 parts by volume of caustic soda solution of 36° Bé. The above stock vat is added to a dyebath which contains in 3000 parts of water 8 parts by volume of caustic soda solution of 36° Bé. and 3 parts of sodium hydrosulfite. 100 parts of cotton are entered at 40° C. into the dyebath thus obtained, 30 parts of sodium chloride are added after ¼ hour and dyeing is carried out for one hour with increase of the temperature to 50° C. Thereupon the cotton is squeezed out, oxidized in the air, rinsed, acidified, again rinsed and soaped at the boil. It becomes dyed in fast bottle green shades.

What we claim is:

1. A vat dyestuff of the general formula

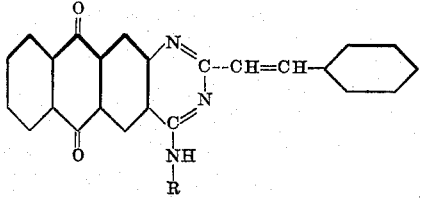

wherein R stands for the radical of an anthraquinone-2:1(N)-benzene acridone attached to the —NH— group in 4-position of the anthraquinone radical.
2. The vat dyestuff of the formula
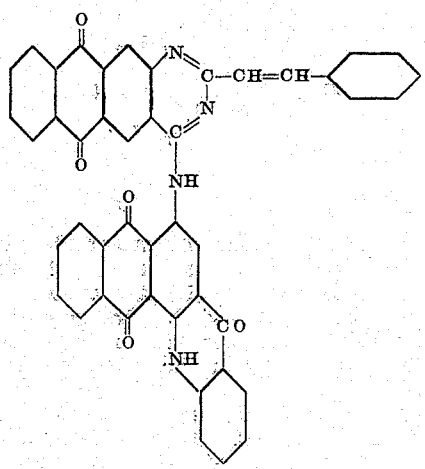
3. The vat dyestuff of the formula
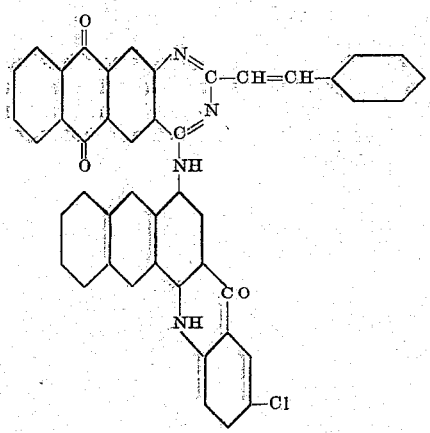
4. The vat dyestuff of the formula
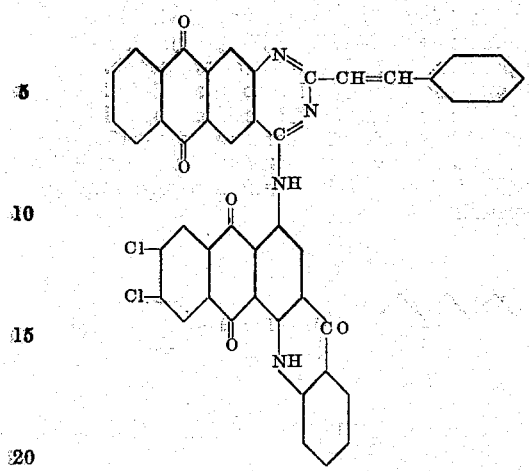
5. A process for the manufacture of vat dyestuffs which comprises heating the quinazoline derivative of the formula
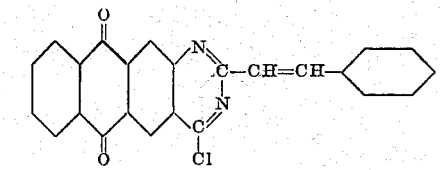
with a 4-amino-anthraquinone-2:1(N)-benzene acridone.
PAUL SUTTER.
WALTER KERN.
No references cited.